United States Patent [19]

Toyoda et al.

[11] Patent Number: 5,316,777
[45] Date of Patent: May 31, 1994

[54] LID OF CONTAINER AND CONTAINER FOR INSTANT FOODS USING THE SAME

[75] Inventors: Takashi Toyoda; Yasuji Hosono; Takashi Funato; Takashi Miyaji, all of Ibaraki; Yukio Kohama, Kanagawa; Kazunori Yamada, Kanagawa; Toshiaki Watanabe, Kanagawa; Chiaki Kanai, Kanagawa, all of Japan

[73] Assignees: Oji Yuki Goseishi Co., Ltd., Tokyo; Tokai Aluminum Foil Co., Ltd., Yokohama, both of Japan

[21] Appl. No.: 869,188

[22] Filed: Apr. 16, 1992

[30] Foreign Application Priority Data

Apr. 19, 1991 [JP] Japan .................................. 3-088733
Apr. 23, 1991 [JP] Japan .................................. 3-092439

[51] Int. Cl.5 .......................... B32B 3/26; B65D 85/72
[52] U.S. Cl. ............................ 426/87; 426/113; 426/126; 428/34.2; 428/315.9; 428/316.6; 428/317.1; 428/319.7; 428/319.9
[58] Field of Search ............... 426/87, 106, 113, 126, 426/557, 615, 640; 428/34.2, 315.5, 315.7, 315.9, 316.6, 317.1, 319.7, 319.9

[56] References Cited

U.S. PATENT DOCUMENTS 4,358,493 11/1982 Ohtsuki et al. ................ 428/34.2

FOREIGN PATENT DOCUMENTS 511562 11/1992 European Pat. Off. .......... 426/113
3514569 10/1986 Fed. Rep. of Germany ... 428/315.9
58-133574 9/1983 Japan .
62-215355 9/1987 Japan .................................. 426/113

OTHER PUBLICATIONS

A Concise Statement (in English) on Japan 58-133,574 (Published Sep. 8, 1983).

Primary Examiner—Leo B. Tentoni
Attorney, Agent, or Firm—Olbon, Spivak, McClelland, Maier & Neustadt

[57] ABSTRACT

A lid which is to be heat-sealed on a container, including a laminated sheet composed of a base layer, an adhesive layer, a metallic layer, and a heat-sealable resin layer, in which the base layer includes a single layer of a stretched resin film having many microvoids or a laminate containing at least the stretched resin film, the lid having an indication of the direction of stripping, including a lug provided at the periphery thereof or a print thereon, in such a manner that the indicated direction of stripping should be set within a range of ±45° with respect to the direction of greatest thermal expansion coefficient of the base layer when heated from 30° C. up to 80° C. at a rate of temperature rise of 10° C./min for 5 minutes. When hot water is poured into a container with the lid partly stripped, the lid is heated by the steam to close the container without assistance.

35 Claims, 5 Drawing Sheets

LID OF CONTAINER AND CONTAINER FOR INSTANT FOODS USING THE SAME

FIELD OF THE INVENTION

This invention relates to a heat-sealing lid of a container for instant foods cooked with hot water, such as noodles, soups, rice porridges, and the like, and to a container using the same.

BACKGROUND OF THE INVENTION

So-called instant foods, such as instant noodles, can be made edible simply by pouring hot water into the container and allowing it to stand for a while, for example, 1 to 5 minutes. Because of this easy cooking process, they are very popular among unmarried persons, persons on night duty, persons living alone, young people, etc.

These instant foods, for example, noodles in a cup, are cooked according to the following steps. After removing a transparent shrink-wrapping film, a lug of the lid heat-sealed to the fringe of the cup is pulled up with the fingers to strip back the lid by about ⅓ or ½ thereof. Ingredients other than noodles, such as dry vegetables and powdered soup, taken from separate bags if so packaged, are placed on the noodles, and hot water is poured into the cup. Then, the stripped portion of the lid is again returned to its original position on the fringe, and the thus closed cup is allowed to stand for a prescribed time, e.g., 1 to 5 minutes, during which time the contents of the cup are cooked. During the cooking, a weight is put on the lid, or the end of the lid is fixed with adhesive tape so as to prevent the lid from curling upward thereby preventing heat dissipation and assuring thermal efficiency. After completion of the cooking, the lid is completely stripped off the cup for serving.

Containers to be used for instant foods of this type include cups made of resins having satisfactory heat retaining properties, such as those prepared by plug-assist vacuum forming or pressure forming of polystyrene paper (extruded expanded polystyrene sheet), high-impact polystyrene sheet, and nylon/polyethylene laminated sheet; those obtained by in-mold expansion of expandable polystyrene beads; and those obtained by injection molding of polypropylene.

Conventional lids for these containers are made from four-layered laminated sheet having heat-sealability as shown in FIG. 5, composed of fine paper having provided thereon a print 14 as base layer 2, adhesive layer 3 formed by extrusion coating of a molten resin film of low-density polyethylene, an ethylene-acrylic acid copolymer, etc. or by coating a urethane type or polyester type liquid adhesive (so-called anchoring agent), aluminum foil layer 4 having a thickness of from 6 to 15 μm, and heat-sealing layer 5 formed by extrusion laminating a low-melting resin (melting point: 80° to 135° C.), e.g., low-density polyethylene and an ethylene-vinyl acetate copolymer, or by coating a solvent solution of such a resin.

However, when hot water is poured into the half-opened container, the fine paper is heated by hot steam through the aluminum layer to release its water content and shrinks, causing upward curling of the lid as illustrated in FIG. 6. In order to keep the lid in the right shape, it has been necessary to put a weight on the lid after adding the hot water.

JP-A-U-58-133574 (the term "JP-A-U" as used herein means an "unexamined published Japanese utility model application") discloses a lid comprising a paper or aluminum base having laminated thereon a transparent biaxially stretched polyethylene film or a biaxially stretched nylon film, which closes the half-opened container by itself through a bimetal effect caused by the steam.

However, the proposed lid proved to undergo inward curling due to excessively high thermal shrinkage of the biaxially stretched film as illustrated in FIG. 7, resulting in failure to tightly close the container.

SUMMARY OF THE INVENTION

An object of the present invention is to provide a lid of a container for instant foods cooked with hot water, which, when half stripped from the container and heated with steam, closes the container by itself without inward or outward curling.

It has been discovered that closing of a container can be achieved by using a lid comprising a metallic foil having laminated on the outer side thereof a stretched resin film having microvoids capable of thermally expanding by the heat of steam to a greater extent than the metallic foil but not to such an extent that causes inward curling of the lid.

A first embodiment of the present invention relates to a lid which is to be heat-sealed on a container and has a lug at the periphery thereof for easy stripping from the container, comprising a laminated sheet composed of a base layer, an adhesive layer, a metallic layer, and a heat-sealable resin layer, in which said base layer comprises a single layer of a stretched resin film having many microvoids or a laminate containing at least said stretched resin film, and said lug is formed in such a manner that the direction of stripping indicated by the lug should be set within a range of ±45° with respect to the direction of greatest thermal expansion coefficient of said base layer when heated from 30° C. up to 80° C. at a rate of temperature rise of 10° C./min for 5 minutes. This embodiment is shown in FIG. 2.

A second embodiment of the present invention is a lid of a container, which has an indication of the direction of stripping printed thereon instead of the above-described lug. This embodiment is shown in FIG. 8.

That is, the second embodiment relates to a lid to be heat-sealed on a container and having printed thereon an indication of the direction of stripping from the container, comprising a laminated sheet composed of a base layer, an adhesive layer, a metallic layer, and a heat-sealable resin layer, in which said base layer comprises a single layer of a stretched resin film having many microvoids or a laminate containing at least said stretched resin film, and said direction of stripping is set within a range of ±45° with respect to the direction of greatest thermal expansion coefficient of said base layer when heated from 30° C. up to 80° C. at a rate of temperature rise of 10° C./min for 5 minutes.

Third and fourth embodiments of the present invention each relate to a container for instant foods which is heat-sealed with the above-described lid.

DETAILED DESCRIPTION OF THE PREFERRED EMBODIMENTS

Figure 1:
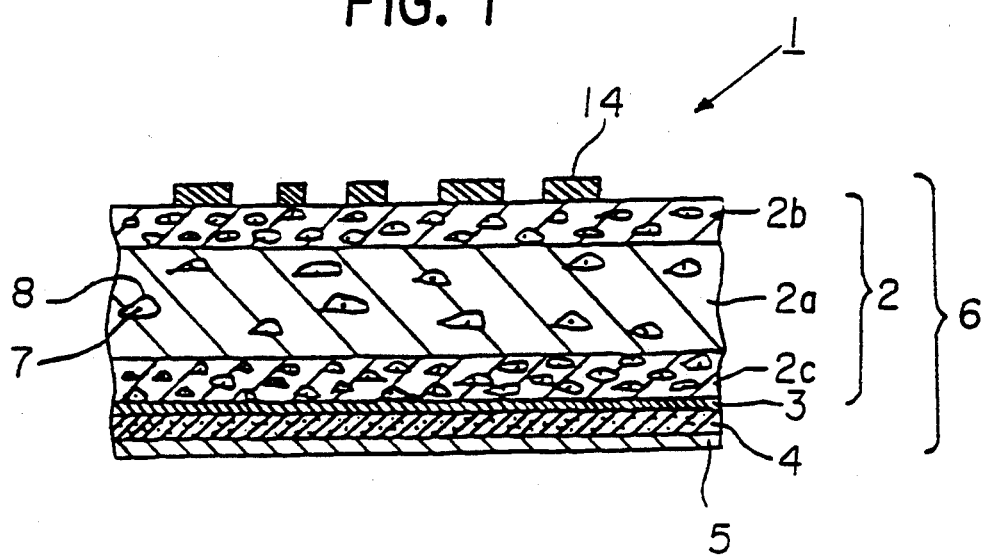
FIG. 1 is a cross section of the lid according to one embodiment of the present invention.

The lid 1 of a container according to the present invention basically comprises laminated sheet 6 composed of base layer 2, adhesive layer 3, metallic layer 4, and heat-sealing resin layer 5 as shown in FIG. 1.

Base layer 2 has (i) a single layer structure comprising stretched resin film 2a having many microvoids 8 which is obtained by stretching a thermoplastic resin film containing inorganic fine powder 7 at a temperature lower than the melting point of the thermoplastic resin or (ii) a laminate structure composed of said stretched resin film 2a and other resin films 2b, 2c.

More specifically base layer 2 includes (i) biaxially stretched finely porous resin layer 2a containing from 5 to 30% by weight of inorganic fine powder 7 or (ii) multi-layered stretched resin film 2 composed of said inorganic powder-containing biaxially stretched finely porous resin layer 2a as a core having laminated on either one or both sides thereof uniaxially stretched finely porous resin film 2b and/or 2c containing from 8 to 65% by weight of inorganic fine powder 7 (see JP-B-46-40794 and JP-B-63-1183, the term "JP-B" as used herein means an "examined published Japanese patent application").

The above-described base layer may further contain a resin film containing no inorganic fine powder 7 so long as the self-closing function of the lid 1 is maintained. For example, in order to impart high gloss to a printed surface, a resin film layer having a thickness of from 0.2 to 8 μm and containing substantially no inorganic fine powder 7 (3% by weight at the most) may be provided on the base layer 2 on the side to be printed.

The base layer may be a laminate film composed of a uniaxially stretched finely porous thermoplastic resin film containing from 8 to 65% by weight of an inorganic fine powder as a surface layer, a biaxially stretched resin film containing from 8 to 40% by weight of an inorganic fine powder as a core, and a thermoplastic resin film having no microvoid or having a lower voids volume than that of the surface layer as a backing layer.

Figure 9:
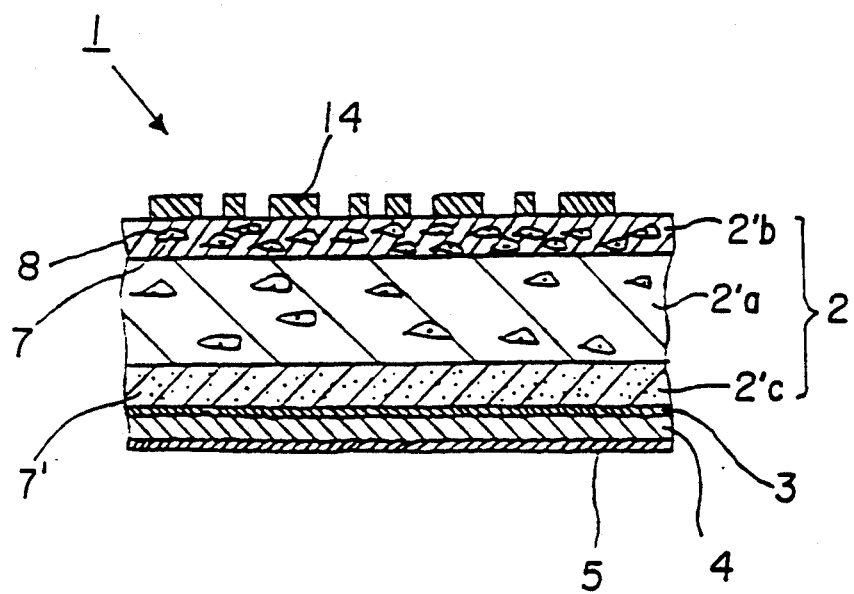
FIG. 9 is a cross section of the lid according to another embodiment of the present invention.

The base layer may also be a laminate film composed of at least a stretched finely porous thermoplastic resin film obtained by stretching a thermoplastic resin film containing from 8 to 65% by weight of an inorganic fine powder (exclusive of flaky powders) as surface layer 2'b and a thermoplastic resin film containing from 5 to 70% by weight of an inorganic flaky fine powder as backing layer 2'c as shown in FIG. 9.

Figure 7:
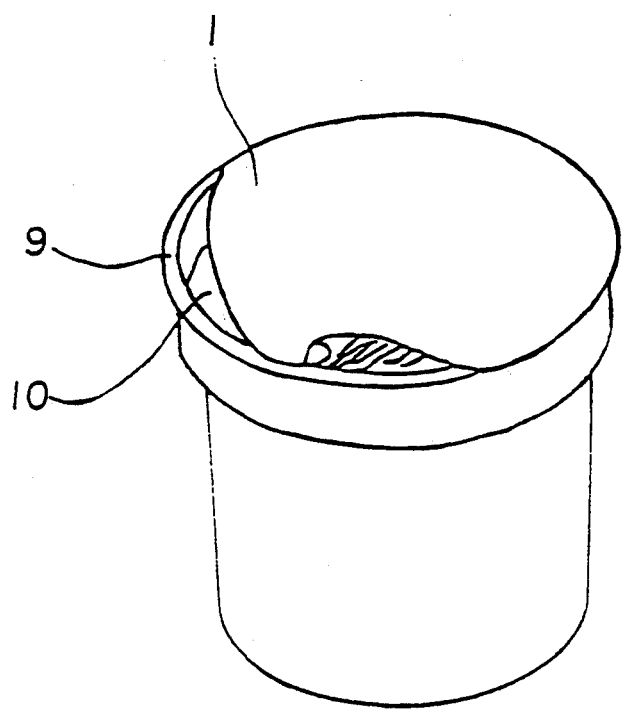
FIG. 7 is a view of a conventional container containing hot water with the lid being curled inward.

Surface layer 2'b contains from 8 to 65% by weight, and preferably from 20 to 55% by weight, of an inorganic fine powder exclusive of a flaky powder for obtaining improved printability. The inorganic fine powder to be used in layer 2'b includes those powders 7 having a spherical shape and those having a rough surface and excludes flaky powders, such as talc and mica. If the inorganic fine powder content in layer 2'b is less than 8% by weight, no improvement in printability is obtained and, also, a sufficient volume of void 8 cannot be obtained not to reduce the weight. With a small void volume, when the lid returns to its original position before stripping by a bimetal effect upon being heated by the steam, it tends to curl inward to make gap 10 between lid 1 and container 9 as shown in FIG. 7. It is not feasible to fill the inorganic fine powder 7 of this type into layer 2'b in a proportion exceeding 65% by weight.

The thermoplastic resin film containing the inorganic fine powder 7 having a spherical shape or a rough surface, when stretched at a temperature lower than its melting point, produces many microvoids 8 around the fine powder nuclei. Surface layer 2'b has a void volume usually of from 4 to 55%, and preferably from 8 to 45%.

Backing layer 2'c is a thermoplastic resin film containing from 5 to 70% by weight, and preferably from 15 to 65% by weight, of an inorganic flaky fine powder. As the flaky powder content increases, the flexural modulus of elasticity of base layer 2 is improved, and the thickness of base layer 2 can be reduced accordingly.

The flaky inorganic powder-containing thermoplastic resin film as backing layer 2'c may be either stretched or non-stretched. A stretched film is preferred from the standpoint of enhancement of film strength while reducing the film thickness. The void volume of backing layer 2'c is smaller than that of surface layer 2'b and usually ranges from 0 up to 12%.

A thermoplastic resin film containing a flaky powder 7' having a flat shape forms few microvoids 8 when stretched. Therefore, backing layer 2'c containing such a flaky powder 7', even when stretched, has poor heat insulating properties so that heat transferred to metallic layer 3 is effectively transferred to surface layer 2'b. As a result, surface layer 2'b efficiently shrinks to rapidly reposition the lid 1.

Further, the separate use of inorganic fine powders different in shape in surface layer 2'b and backing layer 2'c achieves filling of an inorganic fine powder in a larger proportion than when using the same inorganic fine powder in both surface layer 2'b and backing layer 2'c thereby diminishing the heat of combustion of the lid and making combustion of the disposed lid easier.

If desired, a previously printed fine paper or art paper prepared from pulp may be laminated on the surface layer of the above-mentioned laminated sheet with an adhesive. In this case, printing on the surface layer is not necessary as a matter of course.

The inorganic fine powder which can be used in the present invention include flaky powders, such as talc and mica, having a particle size usually of from 0.03 to 15 μm, and preferably of from 0.1 to 5 μm, and an aspect ratio usually of from 8 to 35, and preferably of from 10 to 20; and calcined clay, calcium carbonate, diatomaceous earth, titanium oxide, and vermiculite each having a particle size usually of from 0.03 to 15 μm.

The thermoplastic resin which can be used in the present invention includes polypropylene, polyethylene, ethylene-propylene copolymers, ethylene-1-butene copolymers, ethylene-4-methylpent-1-ene copolymers, propyl-ene-ethylene-1-butene copolymers, polystyrene, polyethylene terephthalate, nylon 6, nylon 6,6, nylon 6,10, and nylon 6,12.

Stretching of the inorganic powder-containing thermoplastic resin film is carried out at a temperature lower than the melting point of the resin at a stretch ratio of from 1.3 to 15, and preferably from 3.5 to 10 in the machine direction (i.e., MD) and/or the transverse direction (i.e., TD).

The stretched resin film essentially used in base layer 2 has many microvoids 8 formed around the inorganic fine powder nuclei (see FIG. 1). This film preferably has a void volume ranging from 4 to 60%, and more preferably from 8 to 50%, as measured according to the following equation:

$$\text{Void Volume } (\%) = [(\rho_0 - \rho)/\rho_0] \times 100$$

wherein $\rho_0$ is the film density before stretching; and $\rho$ is the film density after stretching.

In the present invention, a thermal expansion coefficient ($L_e$) of the base layer is of great importance. The terminology "thermal expansion coefficient" as used herein means a value obtained by a thermomechanical analyzer (TMA) method as follows.

The thermomechanical analyzer "TM-7000" manufactured by Shinku Riko K. K. was used. A 5 mm wide and 25 mm long specimen is fixed by a chuck with a load of 1 g. A measuring span ($L_0$) is set at 15 mm. The specimen is heated from 30° C. to 80° C. at a rate of temperature rise of 10° C./min over 5 minutes. When the temperature reaches 80° C., the span (L) of the specimen is measured. The thermal expansion coefficient is calculated according to the following equation:

$$\text{Thermal Expansion Coefficient } (L_e) \ (\%) = [(L - L_0)/L_0] \times 100$$

The base layer according to the present invention preferably has an $L_e$ ranging from 0.40 to 1.0%, and more preferably from 0.55 to 0.85%. If the $L_e$ exceeds 1.0%, the lid shows too rapid self-closing properties when hot water is poured into the container. As a result, the lug of the stripped lid tends to excessively curl inward before completion of cooking (i.e., before the contents of the container become edible) causing gaps 10 between container 9 and lid 1 as shown in FIG. 7. If the $L_e$ is less than 0.40%, it is very likely that the lid will take too much time to complete self-closing, causing impatience and frustration for the user.

The thermal expansion coefficient of a base layer obtained by the TMA method appears to correspond to a difference between the thermal expansion coefficient of the resin material constituting the stretched resin film and the percent thermal shrinkage of the stretched resin film.

The thermal expansion coefficient of a base layer as obtained by the TMA method is influenced by the void volume and thickness of the base layer, the stretch ratio and stretching temperature of the thermoplastic resin film, and the kind of the resin material and inorganic fine powder, and the like.

The base layer according to the present invention preferably has a tensile modulus of elasticity of from 10,000 to 45,000 kg/cm$^2$, and more preferably from 15,000 to 30,000 kg/cm$^2$, in an axis direction of greatest thermal expansion coefficient, as measured according to JIS K-7113. Since the base layer contains a stretched and thereby orientated resin film, it has a higher modulus of elasticity than that of an unstretched resin film and therefore has a reduced thickness.

The base layer usually has a thickness of from 15 to 180 μm, and preferably from 40 to 100 μm.

In the embodiment shown in FIG. 9, in which the base layer is composed of at least surface layer 2'b having a print 14 and backing layer 2'c, and, if desired, core layer 2'a, surface layer 2'b has a thickness usually of from 2 to 80 μm, and preferably of from 3 to 40 μm; core layer 2'a, if used, usually has a thickness up to 150 μm, and preferably of from 20 to 100 μm; and backing layer 2'c has a thickness usually of from 3 to 80 μm, and preferably of from 10 to 40 μm.

The adhesive which can be used for adhesion of the above-described base layer and a metallic layer, e.g., an aluminum foil, (hereinafter described) includes anchoring agents, e.g., urethane prepolymers (e.g., a mixture of liquid polyester polyole and a polyisocyanate compound, a mixture of polyether polyole and a polyisocyanate compound), polyethylene-imine, or organic titanate; and hot-melt adhesives, e.g., low-density polyethylene, ethylene-vinyl acetate copolymers, and ethylene-acrylic acid copolymers. Coating type adhesives are used in an amount usually of from 1 to 20 g/m$^2$, and preferably of from 2 to 6 g/m$^2$. Hot-melt adhesives are used by extrusion laminating in a molten state to a thickness of from 8 to 30 μm. The thus formed adhesive layer usually has a thickness of from 1 to 30 μm, and preferably from 2 to 15 μm.

The metallic layer which can be used in the present invention include metal foils, such as an aluminum foil and an iron foil, usually having a thickness of from 3 to 25 μm.

From the standpoint of easy handling and economy, a 6 to 15 μm thick aluminum foil is preferred. Based on economic considerations, the thickness of the metal foil is usually smaller than that of the base layer.

The heat-sealing resin layer is a heat-sealing resin having a melting point lower than that of the resin constituting the base layer. Specific examples of suitable heat-sealing resins are low-density polyethylene, linear low-density polyethylene, ethylene-vinyl acetate copolymers (preferably having a vinyl acetate content of not more than 12% by weight), ethylene-acrylic acid copolymers (preferably having an ethylene content of from 65 to 94% by weight), ethylene-alkyl methacrylate copolymers, ionomers (e.g., a metal salt of an ethylene-(meth)acrylic acid copolymer), ethylene-propylene copolymers, ethylene-propylene-1-butene copolymers, and vinyl chloride-vinyl acetate copolymers.

The heat-sealing resin may be extrusion laminated on a metallic sheet, e.g., an aluminum foil, or be dissolved in a solvent and coated on a metallic sheet by means of a coater, followed by drying to form a heat-sealing resin layer.

The heat-sealing resin layer usually has a thickness of from 2 to 50 μm, and preferably from 3 to 40 μm.

The heat-sealing resin layer functions to tightly seal the lid to a container containing instant food to assure prolonged preservability of the food.

Figure 2:
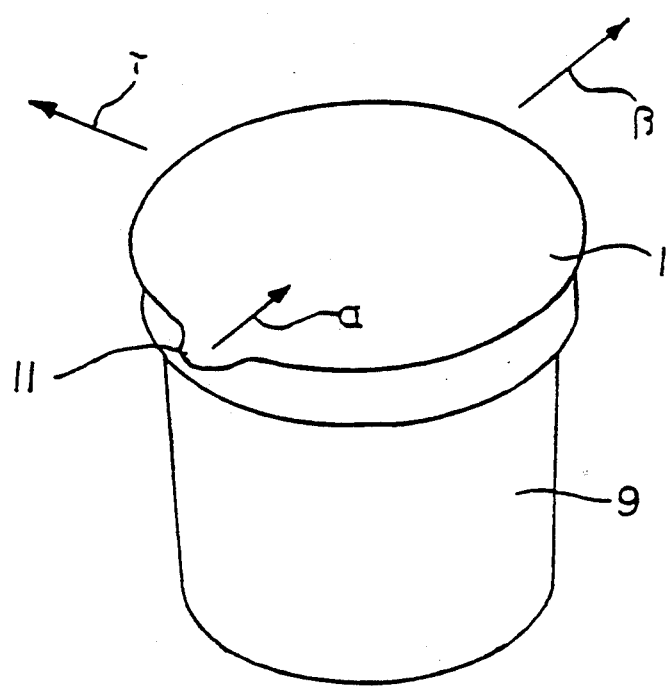
FIG. 2 illustrates the container according to the present invention containing hot water, with the top being closed with a lid according to the present invention.

In one embodiment of the lid according to the present invention, the lid 1 has a lug 11 to be picked up and pulled up with fingers as shown in FIG. 2. The position of the lug is of great importance.

Figure 4:
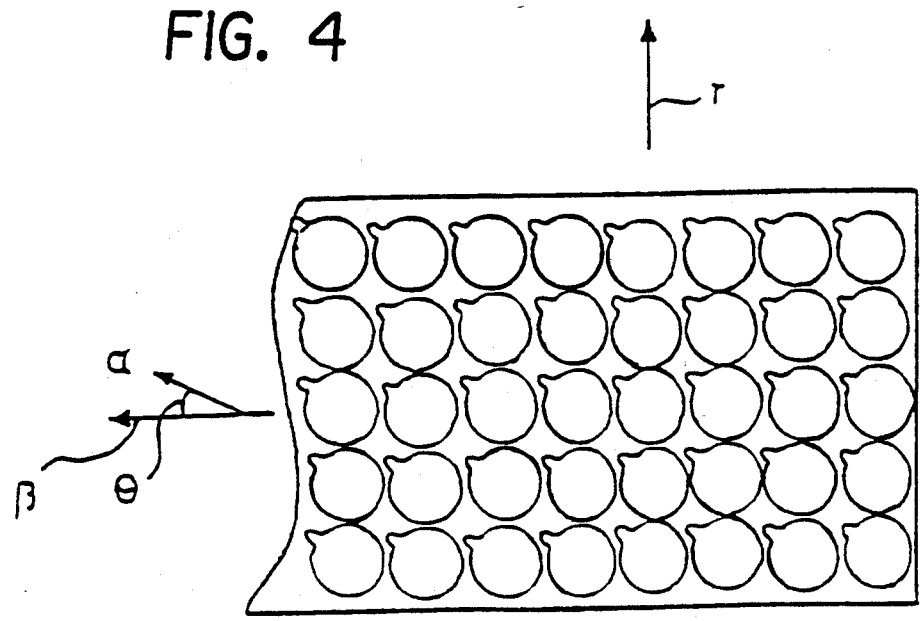
FIG. 4 is a plane view of a laminated sheet ready to be trimmed for obtaining lids according to the present invention.
Figure 5:
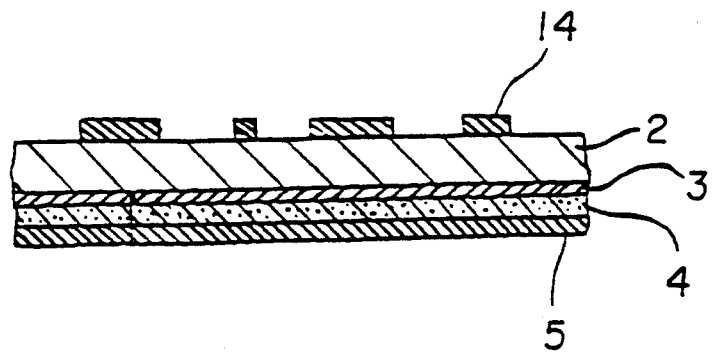
FIG. 5 is a cross section of a conventional lid.
Figure 6:
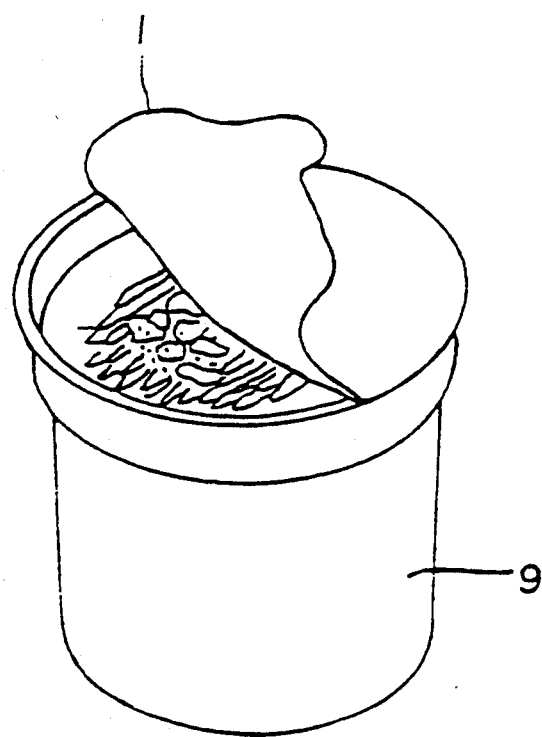
FIG. 6 illustrates a conventional container containing hot water with the lid being curled outward.

The position of the lug 11 is to indicate the direction of stripping the lid 1 to open the container. For achieving self-closing properties in the most accelerated manner, the axis direction of stripping suggested by the lug 11 (direction $\alpha$) preferably corresponds to or is coaxial with the direction exhibiting the greatest thermal expansion coefficient of base layer 2 (direction $\beta$). If direction $\alpha$ of stripping indicated by the lug 11 is the direction of smaller thermal expansion coefficient (direction $\gamma$), the self-closing properties would be reduced, which means an increased time required for self-closure. In order to minimize material loss in trimming laminated sheet 6 for obtaining a high number of lids 1 per unit area, direction $\alpha$ may be set within a range of $\pm 45°$ (angle $\theta$ in FIG. 4) with respect to direction $\beta$ exhibiting the higher thermal expansion coefficient as shown in FIG. 4. In the cases where direction $\alpha$ deviates from direction $\beta$, the self-closing properties are somewhat reduced but still satisfactory as far as the deviation is within the above-recited range.

Figure 8:
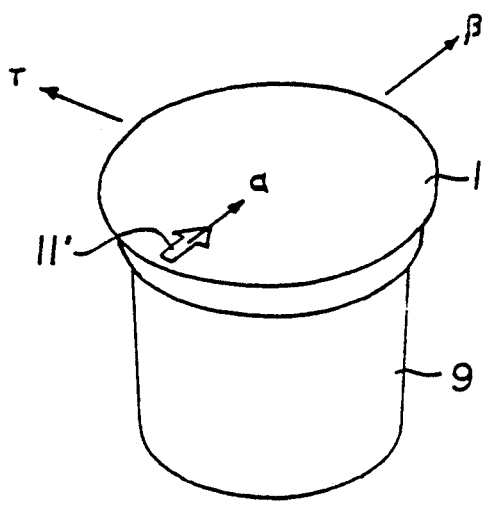
FIG. 8 is a view of the container according to the present invention with the top being closed with the lid according to the present invention having printed thereon an indication of the direction of stripping.

In another embodiment of the present invention, the direction of stripping ($\alpha$direction) is shown by indication 11' printed on the surface of lid 1 instead of forming the above-described lug as shown in FIG. 8. An allowable range of direction $\alpha$ of stripping suggested by indication 11' is the same as described with respect to lug 11.

The lid 1 comprising the laminated sheet 6 usually has a thickness of from 40 to 200 $\mu$m. An economical thickness is from 60 to 150 $\mu$m.

The containers for instant foods are usually made of paper, or resins having satisfactory heat retaining properties, including cups obtained by plug-assist vacuum forming or pressure forming of extruded expanded polystyrene sheet (PSP), high-impact polystyrene (HIPS) sheet, or a nylon/polyethylene laminated sheet; expanded polystyrene cups obtained by in-mold expansion of expandable polystyrene beads; and injection molded cups of thermoplastic resins, e.g., polypropylene, high-density polyethylene, and polycarbonate.

Any conventional instant foods which can be cooked with hot water, such as noodles, soups, porridges, etc., can be put in the containers according to the present invention. The instant foods typically include instant noodles, inclusive of Chinese noodles, buckwheat noodles, or wheat noodles, with powdered soup, seasoning, dry vegetables, dry meat, cooked and dried abura-age (Japanese foodstuff: fried tofu (soybean curd)), etc.; instant soups (powdered soups) with dry vegetables (e.g., corn, Japanese leek, potato, mushroom), etc.; instant miso (Japanese foodstuff: soybean paste) soups with dry vegetables, dry seaweed, dry tofu, etc.; instant porridges comprised of cooked and dried rice and dry seafoods or vegetables; instant zoni (Japanese food) comprised of rice cake, powdered soup, dry vegetables or seafoods; and instant shiruko (Japanese food: sweet red-bean soup with rice cakes).

Figure 3:
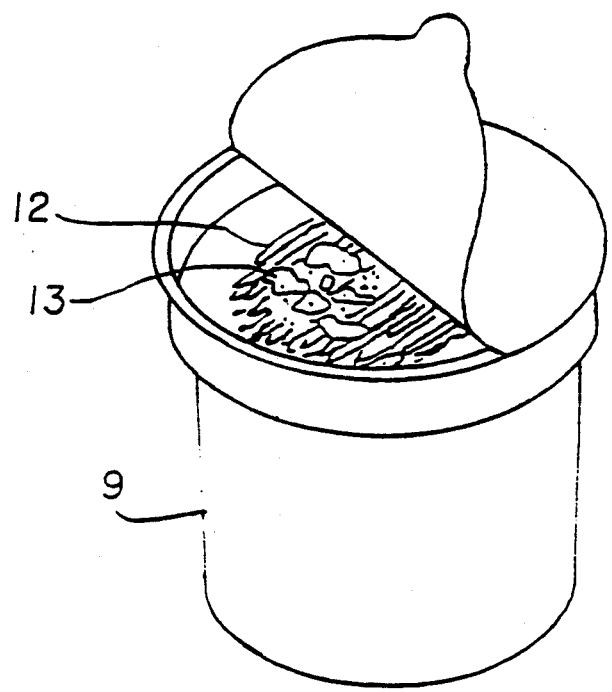
FIG. 3 illustrates the container according to the present invention containing an instant food, with the top being half-opened before pouring in hot water.

The sealed containers for instant foods according to the present invention can be produced by putting laminated sheet 6 composed of base layer 2, adhesive layer 3, metallic layer 4, and heat-sealing resin layer 5 on a prescribed number of cups 9 containing an instant food, for example, dry noodles 12 and other dry materials 13 (see FIG. 3), either naked or separately packaged, and heat-sealing the cups with the laminated sheet usually at 100° to 160° C., and preferably 120° to 140° C., for 0.1 to 3 seconds.

In the production of containers with a lid having a lug, the thus heat-sealed cups are separated from each other, and the laminated sheet is trimmed usually into a circle with projection (lug) 11 on the periphery according to the shape of the top of the cup. Projection 11 is usually 10 mm long for a lid which is 150 mm in diameter.

In the production of containers with a lid having no lug, the thus heat-sealed cups are separated from each other, and the laminated sheet is trimmed into a circle with a peripheral margin for easy stripping (for example, 150 mm in diameter).

The resulting sealed containers are then shrink-wrapped to obtain final products.

In cooking the instant food within the container, hot water is poured into the half-opened container, whereupon the lid 1 is heated by the steam, base layer 2 expands to a greater extent than metallic layer 4 to exhibit a bimetal effect, and lid 1 returns to its original position (see FIG. 2 or FIG. 8) by itself thereby tightly closing cup 9.

The present invention is now illustrated in greater detail by way of Examples, but it should be understood that the present invention is not construed as being limited thereto. All the percents and parts are by weight unless otherwise specified.

EXAMPLE 1

Preparation of Base Layer

1) Composition (A) consisting of 81% of polypropylene (MFR: 0.8 g/10 min; melting point: ca. 164 to 167° C.), 3% of high-density polyethylene, and 16% of calcium carbonate (average particle size: 1.5 $\mu$m) was kneaded in an extruder set at 270° C., extruded into a sheet, and cooled in a cooling apparatus to obtain an unstretched sheet. The sheet was reheated to 150° C. and 5-fold stretched in the machine direction.

2) Composition (B) consisting of 54% of polypropylene (MFR: 4 g/10 min; melting point: ca. 164 to 167° C.) and 46% of calcium carbonate (average particle size: 1.5 $\mu$m) was kneaded in a separate extruder, extruded into a sheet, and laminated on both sides of the stretched film obtained in (1) above to obtain a three-layered laminated film. The resulting laminated film was cooled once to 60° C., reheated to about 175° C., 7.5-fold stretched in the transverse direction by means of a tenter, subjected to heat annealing at 165° C., and cooled to 60° C., followed by trimming to obtain a base layer having a three-layered structure (uniaxially stretched film B/biaxially stretched film A/uniaxially stretched film B) and a total thickness of 80 $\mu$m (B/A/B=20 $\mu$m/40 $\mu$m/20 $\mu$m). The void volume of each layer was B/A/B=4.6%/13.9%/4.6%.

Preparation of Lid

Multi-color offset printing was conducted on the surface side of the above-prepared base layer. A urethane prepolymer anchoring agent (ADCOTE No. 502 produced by Toyo Morton Chemical Co., Ltd.) was coated on the back side of the base layer at a spread quantity of 3 g/m², and a 6 $\mu$m thick aluminum foil was laminated thereon. An ethylene-vinyl acetate copolymer (vinyl acetate content: 5.4%) was extrusion laminated on the aluminum foil at 200° C. to a thickness of 22 $\mu$m, followed by cooling. The resulting laminated sheet was trimmed into a circle of 150 mm in diameter with a lug of 10 mm in length being formed along the machine direction.

Heat-Sealing

A 1,000 cc volume expanded polystyrene container having a diameter of 150 mm containing therein 250 g of dry noodles and 25 g of other materials was heat-sealed with the above-prepared lid at 140° C for 0.5 second under pressure.

Evaluation

After one day, the lug of the lid was pulled up with fingers to partly open the container while leaving ⅓ the lid non-stripped. 600 cc of hot water (about 91° C.) was poured into the container through the opening in 5 seconds, and self-closing properties of the lid were evaluated by measuring the time required for complete closing and observing occurrence of curling of the lid after self-closing. The results obtained are shown in Table 1 below. In Table 1, $L_e$ is the thermal expansion coefficient.

EXAMPLE 2

The procedure of Example 1 was repeated, except for using a base layer prepared as follows. The results of evaluation are shown in Table 1.

Preparation of Base Layer

1) Composition (A) consisting of 81% of polypropylene (MFR: 0.8 g/10 min), 3% of high-density polyethylene, and 16% of calcium carbonate (average particle size: 1.5 μm) was kneaded in an extruder set at 270° C., extruded into a sheet, and cooled in a cooling apparatus to obtain an unstretched sheet. The sheet was reheated to 140° C. and 5-fold stretched in the machine direction.

2) Composition (B) consisting of 54% of polypropylene (MFR: 4 g/10 min) and 46% of calcium carbonate (average particle size: 1.5 μm) and composition (C) consisting of 81% of polypropylene (MFR: 4.0 g/10 min), 3% of high-density polyethylene, and 16% of calcium carbonate (average particle size: 1.5 μm) were kneaded in separate extruders, extruded into a sheet, and each laminated on a side of the stretched film obtained in (1) above to obtain a three-layered laminated film. The resulting laminated film was cooled once to 60° C., reheated to about 160° C., 7.5-fold stretched in the transverse direction by means of a tenter, subjected to heat annealing at 165° C., and cooled to 60° C., followed by trimming to obtain a base layer having a three-layered structure (uniaxially stretched film B/biaxially stretched film A/uniaxially stretched film C) and a total thickness of 80 μm (B/A/C=16 μm/48 μm/16 μm). The void volume of each layer was B/A/C=30%/29.7%/3.0%.

Printing was conducted on layer (B).

EXAMPLE 3

The procedure of Example 1 was repeated, except for using a base layer prepared as follows. The results of on are shown in Table 1.

Preparation of Base Layer

1) A resin composition consisting of 77% of polypropylene (MFR: 2 g/10 min; melting point: ca. 164° C.), 10% of high-density polyethylene, 10% of calcium carbonate (average particle size: 1.5 μm), and 3% of titanium oxide (average particle size: 0.2 μm) was melt-kneaded in an extruder, extruded at 200° C. into a sheet, and cooled in a cooling apparatus to obtain an unstretched sheet. The sheet was reheated to 150° C. and 5-fold stretched in the machine direction. The stretched film was again heated to 158° C. and 7-fold stretched in the transverse direction, subjected to heat annealing at 164° C., cooled to 60° C., and trimmed to obtain a 50 μm thick biaxially stretched single film. The resulting stretched film had a void volume of 44.7%.

EXAMPLE 4

The procedure of Example 1 was repeated, except for using a base layer prepared as follows. The results of evaluation are shown in Table 1.

Preparation of Base Layer

1) Composition (A) consisting of 81% of polypropylene (MFR: 0.8 g/10 min), 3% of high-density polyethylene, and 16% of calcium carbonate (average particle size: 1.5 μm) was kneaded in an extruder set at 270° C., extruded into a sheet, and cooled in a cooling apparatus to obtain an unstretched sheet. The sheet was reheated to 140° C. and 5-fold stretched in the machine direction.

2) Composition (B) consisting of 54% of polypropylene (MFR: 4.0 g/10 min) and 46% of calcium carbonate (average particle size: 1.5 μm) was kneaded in a separate extruder, extruded into a sheet, and laminated on both sides of the 5-fold stretched film obtained in (1) above to obtain a three-layered laminated film. The resulting laminated film was cooled once to 60° C., reheated to about 160° C., 7.5-fold stretched in the transverse direction by means of a tenter, subjected to heat annealing at 165° C., and cooled to 60° C., followed by trimming to obtain a base layer having a three-layered structure (uniaxially stretched film B/biaxially stretched film A/uniaxially stretched film B) and a total thickness of 80 μm (B/A/B=16 μm/48 μm/16 μm). The void volume of each layer was B/A/B=30%/33.7%/30%.

COMPARATIVE EXAMPLE 1

The procedure of Example 1 was repeated, except for using, as a base layer, a commercially available transparent unstretched polypropylene film (TAIKO FHK 2 produced by Nimura Sansyo K. K.; thickness: 60 μm; void volume: 0%). The results of evaluation are shown in Table 1.

COMPARATIVE EXAMPLE 2

The same procedure of Example 1 was repeated, except for using, as a base layer, commercially available paper made of pulp (CORMORANT (trade name) produced by Fuji Kako K. K.; thickness: 90 μm; basis weight: 82.4 g/m²) which is currently employed as a base layer of a lid of cups for instant noodles.

EXAMPLE 5

The procedure of Example 1 was repeated, except for using a base layer prepared as follows. The results of evaluation are shown in Table 1.

Preparation of Base Layer

1) Composition (A) consisting of 81% of polypropylene (MFR: 0.8 g/10 min; melting point: 164° C.), 3% of high-density polyethylene, and 16% of calcium carbonate (average particle size: 1.5 μm) was kneaded in an extruder set at 270° C., extruded into a sheet, and cooled in a cooling apparatus to obtain an unstretched sheet.

The sheet was reheated to 140° C. and 5-fold stretched in the machine direction.

2) Composition (B) consisting of 54% of polypropylene (MFR: 4.0 g/10 min) and 46% of calcium carbonate (average particle size: 1.5 μm) was kneaded in a separate extruder, extruded into a sheet, and laminated on one side of the stretched film obtained in (1) above to obtain a two-layered laminated film.

3) Then, composition (B) and polypropylene (C) (MFR: 4.0 g/10 min) were melt-kneaded in separate extruders and simultaneously extrusion-laminated through the same die onto the stretched film obtained in (1) above on the side opposite to layer (B) with polypropylene layer (C) as an outer layer to obtain a four-layered laminated film. The resulting laminated film was cooled once to 60° C., reheated to about 160° C., 7.5-fold stretched in the transverse direction by means of a tenter, subjected to heat annealing at 165° C., and cooled to 60° C., followed by trimming to obtain a base layer having a four-layered structure (C/B/A/B=5 μm/16 μm/48 μm/11 μm). The void volume of each layer was C/B/A/B=0%/45%/16%/45%. Printing was conducted on layer (C).

EXAMPLE 6

The procedure of Example 1 was repeated, except for using, as a base layer, a synthetic paper consisting of a commercially available multi-layered stretched film of inorganic fine powder-containing polypropylene (YUPO FPG #80 produced by Oji Yuka Goseishi Co., Ltd.; thickness: 80 μm; void volume: 33%). The results of evaluation are shown in Table 1.

laminated sheet at a spread quantity of 3 g/m$^2$, and a 6 μm thick aluminum foil was laminated thereon. An ethylene-vinyl acetate copolymer (vinyl acetate content: 5.4%) was extrusion laminated on the aluminum foil at 200° C. to a thickness of 22 μm, followed by cooling. The resulting laminated sheet was trimmed into a circle of 150 mm in diameter to prepare a lid.

Heat-Sealing

A 1,000 cc volume expanded polystyrene container having a diameter of 150 mm containing therein 250 g of dry noodles and 25 g of other materials was heat-sealed with the lid at 140° C. for 0.5 second under pressure.

Evaluation

After one day, the lid was stripped with fingers in the direction as indicated by the printed arrow to partly open the container while leaving ⅓ the lid non-stripped. 600 cc of hot water (about 91° C.) was poured into the container through the opening in 5 seconds, and self-closing properties of the lid were evaluated in the same manner as in Example 1. The results obtained are shown in Table 2 below.

EXAMPLE 8

The procedure of Example 7 was repeated, except for using a base layer prepared as follows. The results of evaluation are shown in Table 2.

Preparation of Base Layer

1) Composition (A) consisting of 81% of polypropylene (MFR: 0.8 g/10 min; melting point: 164° C.), 3% of

TABLE 1

| | Example 1 | Example 2 | Example 3 | Example 4 | Example 5 | Example 6 | Compar. Example 1 | Compar. Example 2 |
|---|---|---|---|---|---|---|---|---|
| Physical Properties of Base Layer: | | | | | | | | |
| Thickness (μm) | 80 | 80 | 80 | 80 | 80 | 80 | 60 | 90 |
| Void Volume (%) | 10.2 | 24.5 | 44.7 | 32.0 | 29.1 | 32.3 | 0 | — |
| Thermal Expansion Coefficient ($L_e$) (%) | | | | | | | | |
| MD* | 0.65 | 0.71 | 0.85 | 0.49 | 0.60 | 0.45 | 2.33 | — |
| TD** | 0.41 | 0.49 | 0.51 | 0.36 | 0.28 | 0.28 | 1.69 | — |
| Tensile Modulus of Elasticity (kg/cm$^2$) | | | | | | | | |
| MD | 26,710 | 17,560 | 16,600 | 16,980 | 18,410 | 17,520 | 8,200 | — |
| TD | 39,080 | 36,740 | 23,500 | 29,850 | 34,720 | 30,760 | 8,720 | — |
| Percent Thermal Shrinkage (80° C.) (%) | | | | | | | | |
| MD | 0.10 | 0.36 | 0.34 | 0.30 | 0.22 | 0.32 | 0.00 | — |
| TD | −0.07 | 0.09 | 0.00 | 0.05 | 0.05 | 0.04 | 0.01 | — |
| Percent Thermal Shrinkage (120° C.) (%) | | | | | | | | |
| MD | 1.08 | 2.02 | 2.38 | 2.08 | 1.08 | 2.07 | 0.75 | — |
| TD | 0.13 | 1.21 | 0.90 | 1.19 | 1.23 | 0.21 | 0.33 | — |
| Evaluation of Lid: | | | | | | | | |
| Self-closing Properties (sec)*** | observed (18) | observed (25) | observed (50) | observed (120) | observed (28) | observed (130) | observed (3) | not observed |
| Curling after Self-closing | not observed | not observed | not observed | not observed | not observed | not observed | observed | — |

*MD: The machine direction
**TD: The transverse direction
(sec)***: The time required for complete closing after pouring hot water

EXAMPLE 7

An arrow indicating the direction of stripping was printed on the surface of the three-layered laminated sheet obtained in Example 1. The direction indicated by the arrow was made to correspond to the machine direction of the laminated sheet. A urethane prepolymer anchoring agent was coated on the back side of the high-density polyethylene, and 16% of calcium carbonate (average particle size: 1.5 μm) was kneaded in an extruder set at 270° C., extruded into a sheet, and cooled in a cooling apparatus to obtain an unstretched sheet. The sheet was reheated to 150° C. and 5-fold stretched in the machine direction.

2) Composition (B) consisting of 55% of polypropylene (MFR: 4.0 g/10 min) and 45% of calcium carbonate (average particle size: 1.5 μm) and polypropylene (C) (MFR: 4.0 g/10 min) were kneaded in separate extruders, extruded into a sheet, and each laminated onto each side of the stretched film obtained in (1) above to obtain a three-layered laminated film. The resulting laminated film was cooled once to 60° C., reheated to about 175° C., 7.5-fold stretched in the transverse direction by means of a tenter, subjected to heat annealing at 165° C., and cooled to 60° C., followed by trimming to obtain a base layer having a three-layered structure (uniaxially stretched film B/biaxially stretched film A/uniaxially stretched film C) and a total thickness of 80 μm (B/A/C=20 μm/40 μm/20 μm). The void volume of each layer was B/A/C=5.2%/14.2%/0%.

Printing was conducted on Layer (B).

EXAMPLE 9

The procedure of Example 7 was repeated, except for using a base layer prepared as follows. The results of evaluation are shown in Table 2.

Preparation of Base Layer

1) Composition (A) consisting of 81% of polypropylene (MFR: 0.8 g/10 min; melting point: 164° C.), 3% of high-density polyethylene, and 16% of calcium carbonate (average particle size: 1.5 μm) was kneaded in an extruder set at 270° C., extruded into a sheet, and cooled in a cooling apparatus to obtain an unstretched sheet. The sheet was reheated to 140° C. and 5-fold stretched in the machine direction.

2) Composition (B) consisting of 54% of polypropylene (MFR: 4.0 g/10 min) and 46% of calcium carbonate (average particle size: 1.5 μm), composition (C) consisting of 80% of polypropylene (MFR: 4.0 g/10 min), 10% of high-density polyethylene, and 10% of calcium carbonate (average particle size: 1.5 μm), and polypropylene (D) (MFR: 2 g/10 min) were melt-kneaded in separate extruders and simultaneously extrusion-laminated onto the stretched film obtained in (1) above to obtain a four-layered laminated film (B/A/C/D). The resulting laminated film was cooled once to 60° C., reheated to about 160° C., 7.5-fold stretched in the transverse direction by means of a tenter, subjected to heat annealing at 165° C., and cooled to 60° C., followed by trimming to obtain a base layer having a four-layered structure (uniaxially stretched film B/biaxially stretched film A/uniaxially stretched film C/uniaxially stretched film D) and a total thickness of 80 μm (B/A/C/D=15 μm/45 μm/16 μm/4 μm). The void volume of each layer was B/A/C/D=30%/29.7%/2.0%/0%.

Printing was conducted on layer (B).

EXAMPLE 10

The procedure of Example 7 was repeated, except for using a base layer prepared as follows. The results of evaluation are shown in Table 2.

Preparation of Base Layer

1) Composition (A) consisting of 57% of polypropylene (MFR: 2 g/10 min; melting point: ca. 164° C.), 22% of high-density polyethylene, 18% of calcium carbonate (average particle size: 1.5 μm), and 3% of titanium oxide (average particle size: 0.2 μm) was melt-kneaded in an extruder, extruded at 200° C. into a sheet, and cooled to 60° C. in a cooling apparatus to obtain an unstretched sheet. The sheet was reheated to 150° C. and 5-fold stretched in the machine direction.

2) Composition (B) consisting of 85 parts of a propylene-1-butene-ethylene copolymer (melting point: 142° C.) and 15 parts of calcined clay (average particle size: 1.0 μm) was melt-kneaded in a separate extruder at 200° C., extruded into a sheet, and laminated on one side of the stretched film prepared in (1) above to obtain a double-layered laminated film (A/B). The resulting laminated film was cooled once to 60° C., reheated to about 158° C., 7-fold stretched in the transverse direction by means of a tenter, subjected to heat annealing at 165° C., and cooled to 60° C., followed by trimming to obtain a base layer having a double-layered structure (biaxially stretched film A/uniaxially stretched film B) having a total thickness of 80 μm (A/B=70 μm/10 μm). The void volume of each layer was A/B=33%/0%.

Printing was conducted on layer (A).

TABLE 2

| | Example 7 | Example 8 | Example 9 | Example 10 |
|---|---|---|---|---|
| Physical Properties of Base Layer: | | | | |
| Thickness (μm) | 80 | 80 | 80 | 80 |
| Void Volume (%) | 10.2 | 8.2 | 23.1 | 28.9 |
| Thermal Expansion Coefficient ($L_e$) (%) | | | | |
| MD | 0.65 | 0.67 | 0.62 | 0.55 |
| TD | 0.41 | 0.40 | 0.38 | 0.28 |
| Tensile Modulus of Elasticity (kg/cm$^2$) | | | | |
| MD | 26,710 | 24,710 | 19,820 | 18,520 |
| TD | 39,080 | 42,120 | 33,940 | 35,230 |
| Percent Thermal Shrinkage (80° C.) (%) | | | | |
| MD | 0.10 | 0.28 | 0.22 | 0.18 |
| TD | −0.07 | −0.09 | 0.05 | 0.06 |
| Percent Thermal Shrinkage (120° C.) (%) | | | | |
| MD | 1.08 | not measured | | |
| TD | 0.13 | not measured | | |
| Evaluations: | | | | |
| Self-closing Properties (sec)* | observed (18) | observed (10) | observed (12) | observed (12) |
| Curling after Self-closing | not observed | not observed | not observed | not observed |

(sec)*: The time required for complete closing after pouring hot water

EXAMPLE 11

Preparation of Base Layer

1) Composition (A) consisting of 85% of polypropylene (MFR: 0.8 g/10 min; melting point: 164), 5% of high-density polyethylene, and 10% of calcium carbonate (average particle size: 1.5 μm) was kneaded in an extruder set at 270° C., extruded into a sheet, and cooled in a cooling apparatus to obtain an unstretched sheet. The sheet is reheated to 150° C. and 5-fold stretched in the machine direction.

2) Composition (B) consisting of 60% of polypropylene (MFR: 4.0 g/10 min) and 40% of calcium carbonate (average particle size: 1.5 μm) and composition (C) consisting of 60% of polypropylene (MFR: 4.0 g/10 min) and 40% of talc (average particle size: 1.2 μm; aspect ratio: 12) were kneaded in separate extruders, extruded into a sheet, and each laminated onto each side of the stretched film obtained in (1) above to obtain a three-layered laminated film (B/A/C). The resulting laminated film was cooled once to 60° C., reheated to about 161° C., 7.5-fold stretched in the transverse direction by means of a tenter, subjected to heat annealing at 165° C., and cooled to 60° C., followed by trimming to obtain a base layer having a three-layered structure (uniaxially stretched film B/biaxially stretched film A/uniaxially stretched film C) and a total thickness of 70 μm (B/A/C=17 μm/36 μm/17 μm). The void volume of each layer was B/A/C=30%/25%/5%.

Preparation of Lid

Printing was conducted on layer (B) of the above-prepared base layer. A urethane prepolymer anchoring agent was coated on the back side of the base layer at a spread quantity of 3 g/m², and a 6 μm thick aluminum foil was laminated thereon. An ethylene-vinyl acetate copolymer (vinyl acetate content: 5.4%) was extrusion laminated onto the aluminum foil at 200° C. to a thickness of 22 μm, followed by cooling. The resulting laminated sheet was trimmed into a circle of 150 mm in diameter with a lug of 10 mm in length being formed at the periphery along the machine direction.

Heat-Sealing

A 1,000 cc volume expanded polystyrene container having a diameter of 150 mm containing therein 250 g of dry noodles and 25 g of other materials was heat-sealed with the above-prepared lid at 140° C. for 0.5 second under pressure.

Evaluation

Self-closing properties of the lid were evaluated in the same manner as in Example 1. The results obtained are shown in Table 3 below.

EXAMPLE 12

The procedure of Example 11 was repeated, except for using a base layer prepared as follows. The results of evaluation are shown in Table 3.

Preparation of Base Layer

1) Composition (A) consisting of 85% of polypropylene (MFR: 0.8 g/10 min; melting point: 164° C.), 5% of high-density polyethylene, and 10% of talc (average particle size: 1.2 μm; aspect ratio: 12) was kneaded in an extruder set at 270° C., extruded into a sheet, and cooled in a cooling apparatus to obtain an unstretched sheet. The sheet was reheated to 150° C. and 5-fold stretched in the machine direction.

2) Composition (B) consisting of 90% of polypropylene (MFR: 4.0 g/10 min) and 10% of calcium carbonate (average particle size: 1.5 μm) and composition (C) consisting of 95% of polypropylene (MFR: 4.0 g/10 min) and 5% of talc (average particle size: 1.2 μm; aspect ratio: 12) were kneaded in separate extruders, extruded into a sheet, and each laminated onto each side of the stretched film obtained in (1) above to obtain a three-layered laminated film (B/A/C). The resulting laminated film was cooled once to 60° C., reheated to about 160° C., 7.5-fold stretched in the transverse direction by means of a tenter, subjected to heat annealing at 165° C., and cooled to 60° C., followed by trimming to obtain a base layer having a three-layered structure (uniaxially stretched film B/biaxially stretched film A/uniaxially stretched film C) having a total thickness of 70 μm (B/A/C=17 μm/36 μm/17 μm). The void volume of each layer was B/A/C=8%/10%/2%.

Printing was conducted on layer (B).

EXAMPLE 13

The procedure of Example 11 was repeated, except for using a base layer prepared as follows. The results of evaluation are shown in Table 3.

Preparation of Base Layer

1) Composition (A) consisting of 57% of polypropylene (MFR: 2 g/10 min; melting point: ca. 164° C.), 18% of high-density polyethylene, 22% of calcium carbonate (average particle size: 1.5 μm), and 3% of titanium oxide (average particle size: 0.2 μm) was melt-kneaded in an extruder, extruded into a sheet at 200° C., and cooled in a cooling apparatus to obtain an unstretched sheet. The sheet was reheated to 150° C. and 5-fold stretched in the machine direction.

2) Composition (B) consisting of 40% of polypropylene (MFR: 4 g/10 min) and 60% of talc (average particle size: 1.2 μm; aspect ratio: 15) was melt-kneaded in separate extruder at 200° C., extruded into a sheet, and laminated onto one side of the stretched film obtained in (1) above to obtain a double-layered laminated film (A/B). The resulting laminated film was cooled once to 60° C., reheated to about 158° C., 7-fold stretched in the transverse direction by means of a tenter, subjected to heat annealing at 164° C., and cooled to 60° C., followed by trimming to obtain a base layer having a double-layered structure (biaxially stretched film A/uniaxially stretched film B) having a total thickness of 70 μm (A/B=52 μm/18 μm). The void volume of each layer was A/B=40%/12%.

Printing was conducted on layer (A).

EXAMPLE 14

The procedure of Example 11 was repeated, except for using a base layer prepared as follows. The results of evaluation are shown in Table 3.

Preparation of Base Layer

1) Composition (A) consisting of 32% of polypropylene (MFR: 0.8 g/10 min; melting point: ca. 164° C.), 3% of high-density polyethylene, and 65% of calcium carbonate (average particle size: 15 μm) and composition (B) consisting of 80% of polypropylene (MFR: 0.8 g/10 min) and 20% of talc (average particle size: 1.2 μm; aspect ratio: 12) were melt-kneaded in separate extruders, simultaneously extruded through the same die into a double-layered sheet and cooled in a cooling apparatus to obtain an unstretched laminated sheet (A/B). The resulting laminated film was reheated to about 150° C., 5-fold stretched in the machine direction, subjected to heat annealing at 165° C., and cooled to 60° C., followed by trimming to obtain a base layer having a double-layered structure and a total thickness of 70 μm (A/B=52 μm/18 μm). The void volume of each layer was A/B=35%/3%.

Printing was conducted on layer (A).

TABLE 3

|  | Example 11 | Example 12 | Example 13 | Example 14 |
|---|---|---|---|---|
| Physical Properties of Base Layer: | | | | |
| Thickness μ(m) | 70 | 70 | 70 | 70 |
| Void Volume (%) | 21.4 | 7.6 | 32.8 | 26.8 |
| Thermal Expansion Coefficient ($L_e$) (%) | | | | |
| MD | 0.55 | 0.64 | 0.80 | 0.79 |

TABLE 3-continued

| | Example 11 | Example 12 | Example 13 | Example 14 |
|---|---|---|---|---|
| TD Tensile Modulus of Elasticity (kg/cm²) | 0.30 | 0.40 | 0.50 | 0.99 |
| MD | 19,050 | 22,540 | 17,550 | 20,190 |
| TD | 35,800 | 50,810 | 24,320 | 11,230 |
| Percent Thermal Shrinkage (80° C.) (%) | | | | |
| MD | 0.15 | 0.08 | 0.10 | 0.12 |
| TD | 0.03 | −0.01 | 0.00 | 0.00 |
| Evaluations: | | | | |
| Self-closing Properties (sec)* | observed (9) | observed (11) | observed (10) | observed (13) |
| Curling after Self-closing | not observed | not observed | not observed | not observed |

(sec)*: The time required for complete closing after pouring hot water

As described and demonstrated above, the lid of a container according to the present invention exerts a bimetal effect upon being heated by the steam of hot water poured into the container and is therefore capable of returning to its original position by itself to close the container. After closing the container, the lid undergoes neither upward nor inward curling as observed with the conventional lid so that there is no need to put a weight thereon.

While the invention has been described in detail and with reference to specific examples thereof, it will be apparent to one skilled in the art that various changes and modifications can be made therein without departing from the spirit and scope thereof.

What is claimed is:

1. A lid, which is to be heat-sealed on a container, having a lug at the periphery thereof for easy stripping from the container, comprising a laminated sheet having, in sequence order, (1) a base layer, (2) an adhesive layer, (3) an aluminum foil layer having a thickness of from 3 to 25 μm, and (4) a heat-sealable resin layer, wherein said base layer comprises a stretched resin film having microvoids therein and having an axis direction of greatest thermal expansion coefficient, and wherein said lug is formed in such a manner that the direction of stripping indicated by the lug should be set within a range of ±45° with respect to the direction of greatest thermal expansion coefficient of said base layer when heated from 30° C. up to 80° C. at a rate of temperature rise of 10° C./min for 5 minutes, said base layer having a thermal expansion coefficient in said axis direction of from 0.40 to 1.0%, as measured by heating from 30° C. up to 80° C. at a rate of temperature rise of 10° C./min for 5 minutes.

2. The lid as claimed in claim 1, wherein said base layer has a tensile modulus of elasticity in said axis direction of from 10,000 to 45,000 kg/cm², as measured by heating from 30° C. up to 80° C. at a rate of temperature rise of 10° C./min for 5 minutes, and a thickness greater than that of the aluminum foil layer.

3. The lid as claimed in claim 1, wherein said stretched resin film has a void volume of from 4 to 60% as measured by equation:

Void Volume (%) = [($\rho_0 - \rho$)/$\rho_0$] × 100 wherein $\rho_0$ is the film density before stretching; and $\rho$ is the film density after stretching.

4. The lid as claimed in claim 1, wherein said lid has a thickness of from 40 to 200 μm.

5. The lid as claimed in claim 1, wherein said base layer has a thickness of from 15 to 180 μm.

6. The lid as claimed in claim 1, wherein said base layer is a laminate comprising a uniaxially stretched resin film having microvoids therein which is obtained by stretching a thermoplastic resin film containing from 8 to 65% by weight of an inorganic fine powder as a surface layer contacting said adhesive layer and a biaxially stretched resin film which is obtained by biaxially stretching a thermoplastic resin film containing from 5 to 30% by weight of an inorganic fine powder as a core.

7. The lid as claimed in claim 1, wherein said base layer is a laminate comprising a stretched resin film having microvoids therein which is obtained by stretching a thermoplastic resin film containing from 8 to 65% by weight of an inorganic fine powder other than a flaky powder as a surface layer and a thermoplastic resin film containing from 5 to 70% by weight of an inorganic flaky fine powder as a backing layer.

8. The lid as claimed in claim 1, wherein said base layer is a laminate film comprising a uniaxially stretched resin film having microvoids therein which is obtained by uniaxially stretching a thermoplastic resin film containing an inorganic fine powder as a surface layer, a biaxially stretched resin film as a core, and a thermoplastic resin film having no microvoids therein or having a lower void volume than that of the surface layer, as a backing layer.

9. The lid as claimed in claim 1, wherein said lug is coaxial with the direction of greatest thermal expansion coefficient of said base layer.

10. A lid to be heat-sealed on a container and stripped therefrom, having printed thereon an indicia of the direction of stripping from the container, comprising a laminated sheet having, in sequence order, (1) a base layer, (2) an adhesive layer, (3) an aluminum foil layer having a thickness of from 3 to 25 μm, and (4) a heat-sealable resin layer, wherein said base layer comprises a stretched resin film having microvoids therein and having an axis of greatest thermal expansion coefficient, and wherein said direction of stripping is set within a range of ±45° with respect to the direction of greatest thermal expansion coefficient of said base layer when heated from 30° C. up to 80° C. at a rate of temperature rise of 10° C./min for 5 minutes, said base layer having a thermal expansion coefficient in said axis direction of from 0.40 to 1.0%, as measured by heating from 30° C. up to 80° C. at a rate of temperature rise of 10° C./min for 5 minutes.

11. The lid as claimed in claim 10, wherein said base layer has a tensile modulus of elasticity in said axis direction of from 10,000 to 45,000 kg/cm², as measured by heating from 30° C. up to 80° C. at a rate of temperature rise of 10° C./min for 5 minutes, and a thickness greater than that of the aluminum foil layer.

12. The lid as claimed in claim 10, wherein said stretched resin film has a void volume of from 4 to 60% as measured by equation:

Void Volume (%) = [($\rho_0 - \rho$)/$\rho_0$] × 100 wherein $\rho_0$ is the film density before stretching; and $\rho$ is the film density after stretching.

13. The lid as claimed in claim 10, wherein said lid has a thickness of from 40 to 200 μm.

14. The lid as claimed in claim 10, wherein said base layer has a thickness off rom 15 to 180 μm.

15. The lid as claimed in claim 10, wherein said indicia is coaxial with the direction of greatest thermal expansion coefficient of said base layer.

16. A container for an instant food which can be cooked by pouring hot water into the container, which is sealed with a stripping lid having a lug at the periphery thereof for easy stripping from the container, said lid comprising a laminated sheet having, in sequence order, (1) a base layer, (2) an adhesive layer, (3) an aluminum foil layer having a thickness of from 3 to 25 μm, and (4) a heat-sealable resin layer, wherein said base layer comprises a stretched resin film having microvoids therein and having an axis of greatest thermal expansion coefficient, and wherein said lug is formed in such a manner that the direction of stripping indicated by the lug should be set within a range of ±45° with respect to the direction of greatest thermal expansion coefficient of said base layer when heated from 30° C. up to 80° C. at a rate of temperature rise of 10° C./min for 5 minutes, said base layer having a thermal expansion coefficient in said axis direction of from 0.40 to 1.0%, as measured by heating from 30° C. up to 80° C. at a rate of temperature rise of 10° C./min for 5 minutes.

17. The container as claimed in claim 16, wherein said base layer has a tensile modulus of elasticity in said axis direction of from 10,000 to 45,000 kg/cm², as measured by heating from 30° C. up to 80° C. at a rate of temperature rise of 10° C./min for 5 minutes, and a thickness greater than that of the aluminum foil layer.

18. A container for an instant food which can be cooked by pouring hot water into the container, which is sealed with a stripping lid having printed thereon an indicia of the direction of stripping from the container, said lid comprising a laminated sheet having, in sequence order, (1) a base layer, (2) an adhesive layer, (3) an aluminum foil layer having a thickness of from 3 to 25 μm, and (4) a heat-sealable resin layer, wherein said base layer comprises a stretched resin film having microvoids therein and having an axis of greatest thermal expansion coefficient, and wherein said direction of stripping is set within a range of ±45° with respect to the direction of greatest thermal expansion coefficient of said base layer when heated from 30° C. up to 80° C. at a rate of temperature rise of 10° C./min for 5 minutes, said base layer having a thermal expansion coefficient in said axis direction of from 0.40 to 1.0%, as measured by heating from 30° C. up to 80° C. at a rate of temperature rise of 10° C./min for 5 minutes.

19. A container as claimed in claim 18, wherein said base layer has a tensile modulus of elasticity in said axis direction of from 10,000 to 45,000 kg/cm², as measured by heating from 30° C. up to 80° C. at a rate of temperature rise of 10° C./min for 5 minutes, and a thickness greater than that of the aluminum foil layer.

20. The container as claimed in claim 16, wherein said instant food comprises dry noodles, seasonings, and other ingredients.

21. The container as claimed in claim 18, wherein said instant food comprises dry noodles, seasonings, and other ingredients.

22. The container as claimed in claim 20, wherein said noodles is Chinese noodles, buckwheat noodles, or wheat noodles.

23. The container as claimed in claim 21, wherein said noodles is Chinese noodles, buckwheat noodles, or wheat noodles.

24. The container as claimed in claim 16, wherein said instant food is dried rice porridge, powdered, soup with dry vegetables, powdered shiruko, or powdered miso soup with dry vegetables, dry seaweed or dry tofu.

25. The container as claimed in claim 18, wherein said instant food is dried rice porridge, powdered soup with dry vegetables, powdered shiruko, or powdered miso soup with dry vegetables, dry seaweed or dry tofu.

26. The container as claimed in claim 16, wherein said container is a cup made of paper, a cup prepared by plug-assist vacuum forming or pressure forming of extruded expanded polystyrene sheet, high-impact polystyrene sheet, or nylon/polyethylene laminated sheet, a cup obtained by in-mold expansion of expandable polystyrene beads, or cup obtained by injection molding of polypropylene.

27. The container as claimed in claim 18, wherein said container is a cup made of paper, a cup prepared by plug assist vacuum forming or pressure forming of extruded expanded polystyrene sheet, high-impact polystyrene sheet, or nylon/polyethylene laminated sheet, a cup obtained by in-mold expansion of expandable polystyrene beads, or cup obtained by injection molding of polypropylene.

28. The container as claimed in claim 16, wherein said stretched resin film of the base layer has a void volume of from 4 to 60% as measured by equation:

$$\text{Void Volume (\%)} = [(\rho_0 - \rho)/\rho_0] \times 100$$

wherein $\rho_0$ is the film density before stretching; and $\rho$ is the film density after stretching.

29. The container as claimed in claim 18, wherein said stretched resin film of the base layer has a void volume of from 4 to 60% as measured by equation:

$$\text{Void Volume (\%)} = [(\rho_0 - \rho)/\rho_0] \times 100$$

wherein $\rho_0$ is the film density before stretching; and $\rho$ is the film density after stretching.

30. The container as claimed in claim 16, wherein said lid has a thickness of from 40 to 200 μm.

31. The container as claimed in claim 18, wherein said lid has a thickness of from 40 to 200 μm.

32. The container as claimed in claim 16, wherein said base layer has a thickness of from 15 to 180 μm.

33. The container as claimed in claim 18, wherein said base layer has a thickness of from 15 to 180 μm.

34. The container as claimed in claim 16, wherein said lug is coaxial with the direction of greatest thermal expansion coefficient of said base layer.

35. The container as claimed in claim 18, wherein said indicia is coaxial with the direction of greatest thermal expansion coefficient of said base layer.

* * * * *